US010706308B2

(12) United States Patent
Zaman et al.

(10) Patent No.: US 10,706,308 B2
(45) Date of Patent: Jul. 7, 2020

(54) IMAGE PROCESSING FOR AUTOMATED OBJECT IDENTIFICATION

(71) Applicant: Accenture Global Solutions Limited, Dublin (IE)

(72) Inventors: Md Faisal Zaman, Drumcondra (IE); Perikles Rammos, Dublin (IE); Cian O'Hagan, County Dublin (IE)

(73) Assignee: Accenture Global Solutions Limited, Dublin (IE)

(*) Notice: Subject to any disclaimer, the term of this patent is extended or adjusted under 35 U.S.C. 154(b) by 170 days.

(21) Appl. No.: 16/057,246

(22) Filed: Aug. 7, 2018

(65) Prior Publication Data
US 2020/0050879 A1   Feb. 13, 2020

(51) Int. Cl.
*G06K 9/03* (2006.01)
*G06N 20/00* (2019.01)
(Continued)

(52) U.S. Cl.
CPC .......... *G06K 9/036* (2013.01); *G05D 1/0246* (2013.01); *G06N 20/00* (2019.01); *G06T 3/40* (2013.01); *G06T 5/50* (2013.01); *G06T 7/0002* (2013.01); *G06K 2209/23* (2013.01); *G06T 7/11* (2017.01); *G06T 2207/10016* (2013.01); *G06T 2207/20081* (2013.01); *G06T 2207/20084* (2013.01); *G06T 2207/30168* (2013.01); *G06T 2207/30252* (2013.01)

(58) Field of Classification Search
CPC .. G06K 9/036; G06K 2209/23; G06K 9/6267; G06N 20/00; G05D 1/0246; G06T 3/40; G06T 5/50; G06T 7/0002; G06T 7/11; G06T 2207/10016; G06T 2207/20081; G06T 2207/20084; G06T 2207/30168; G06T 2207/30252
See application file for complete search history.

(56) References Cited

U.S. PATENT DOCUMENTS

2016/0267396 A1\* 9/2016 Gray ...................... G06N 20/00
2017/0032257 A1\* 2/2017 Sharifi .................... G06N 5/04

OTHER PUBLICATIONS

Extended European Search Report for Application No. EP19190452.3, dated Dec. 16, 2019, 9 pages.
(Continued)

*Primary Examiner* — Phuoc Tran
(74) *Attorney, Agent, or Firm* — Harrity & Harrity, LLP

(57) ABSTRACT

A device obtains an image and generates, based on the image and using an image generation model, a set of candidate images for object recognition. The device determines, based on the set of candidate images and using an image evaluation model, that one or more candidate images, of the set of candidate images, are processed during image generation and using the image generation model to improve a resolution of the image. The device determines image embeddings for the one or more candidate images and based on the image, and determines an embeddings error for the one or more candidate images based on the image embeddings and the image. The device determines an identification of a feature of the image based on the image embeddings and the embeddings error, and performs an action relating to the identification of the feature based on determining the identification of the feature.

22 Claims, 8 Drawing Sheets

(51) Int. Cl.
   *G05D 1/02* (2020.01)
   *G06T 3/40* (2006.01)
   *G06T 5/50* (2006.01)
   *G06T 7/00* (2017.01)
   *G06T 7/11* (2017.01)

(56) References Cited

OTHER PUBLICATIONS

Haris M., et al., "Task-Driven Super Resolution: Object Detection in Low-resolution Images", arxiv.org, Cornell University Library, 201 Olin Library Cornell University Ithaca, NY14853, Mar. 30, 2018, 26 pages, XP080860546.
Li J., et al., "Perceptual Generative Adversarial Networks for Small Object Detection", arxiv.org, Cornell University Library, 201 Olin Library Cornell University Ithaca, NY14853, Jun. 16, 2017, 9 pages, XP080770370.

* cited by examiner

IMAGE PROCESSING FOR AUTOMATED OBJECT IDENTIFICATION

BACKGROUND

Image capture devices, such as cameras, video cameras, and/or the like may be used to capture images. For example, a user device may include a camera to capture an image of a user. Similarly, an autonomous vehicle may include a video camera to capture video of an environment in which the autonomous vehicle is operating. The image capture device may provide an image to a processing device, such as the user device, for processing and/or utilization. For example, the user device may use a facial recognition technique to determine an identity of a user of the user device. In this case, a user device may determine that the user of the user device is an authorized user based on analyzing an image captured of the user, and the user device may enable access to the user device for the user. Similarly, a control device of the autonomous vehicle may identify an object within a threshold proximity to the autonomous vehicle based on analyzing a frame of a video, and may control a direction and/or a speed of the autonomous vehicle to avoid the object.

SUMMARY

According to some possible implementations, a device may include one or more memories, and one or more processors, communicatively coupled to the one or more memories, to obtain an image. The one or more processors may generate, based on the image and using an image generation model, a set of candidate images for object recognition. The one or more processors may determine, based on the set of candidate images and using an image evaluation model, that one or more candidate images, of the set of candidate images, are processed during image generation and using the image generation model to improve a resolution of the image. The one or more processors may determine image embeddings for the one or more candidate images and based on the image, and may determine an embeddings error for the one or more candidate images based on the image embeddings and the image. The one or more processors may determine an identification of a feature of the image based on the image embeddings and the embeddings error, and may perform an action relating to the identification of the feature based on determining the identification of the feature.

According to some possible implementations, a method may include obtaining an item of media, and generating, based on the item of media and using a media generation model, a set of candidate media for object recognition. The method may include determining, based on the set of candidate media and using a media evaluation model, that one or more candidate media, of the set of candidate media, are processed during media generation and using the media generation model to improve a quality of a feature of the item of media. The method may include determining media embeddings for the one or more candidate media and based on the item of media, and determining an embeddings error for the one or more candidate media based on the media embeddings and the item of media. The method may include determining an identification of the feature of the item of media based on the media embeddings and the embeddings error, and communicating with another device to provide information identifying the feature based on determining the identification of the feature.

According to some possible implementations, a non-transitory computer-readable medium may store instructions that include one or more instructions that, when executed by one or more processors of a device, cause the one or more processors to generate, based on an image and using an image generation model, a set of candidate images for object recognition, wherein each candidate image, in the set of candidate images, is associated with an increased image resolution relative to the image. The one or more instructions may cause the one or more processors to determine image embeddings for the set of candidate images and based on the image, and to determine that an embeddings error threshold for the image embeddings is satisfied. The one or more instructions may cause the one or more processors to determine an identification of a feature of the image based on the image embeddings and based on determining that the embeddings error threshold is satisfied, and to provide information identifying the feature of the image based on determining the identification of the feature.

DETAILED DESCRIPTION

Figure 1A:
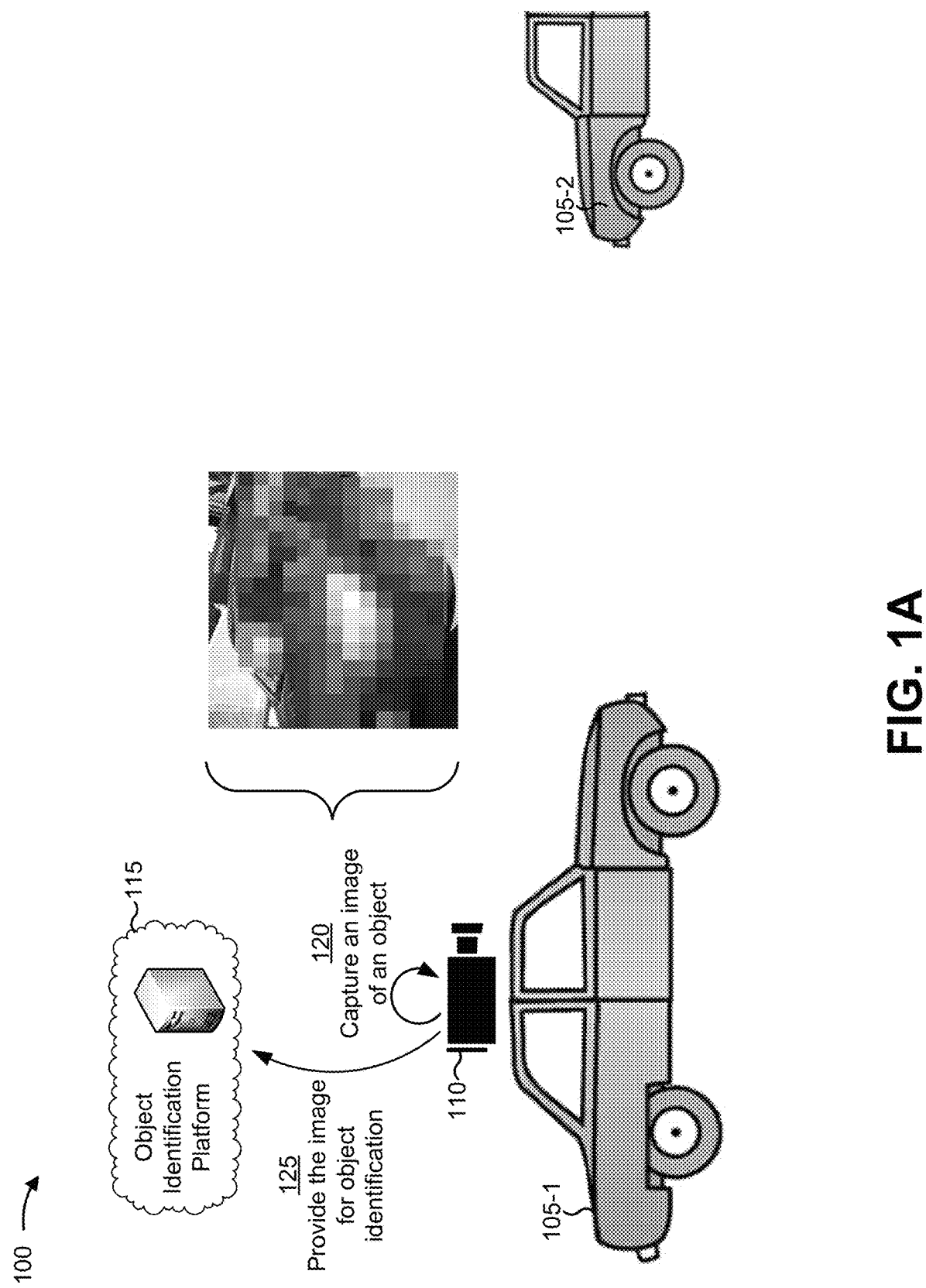
FIGS. 1A-1C are diagrams of an example implementation described herein.

The following detailed description of example implementations refers to the accompanying drawings. The same reference numbers in different drawings may identify the same or similar elements.

An image capture device and an image processing device may, respectively, capture an image and process the image to perform object recognition on the image. For example, a user device may include a camera to capture an image, and may process the image to tag one or more users in the image, to perform a biometric type of classification on the image (e.g., to perform facial recognition and unlock the user device), and/or the like. Similarly, image capture devices of autonomous vehicles may capture images and/or video, and may process the images and/or video to identify objects, and to determine control commands to avoid the objects based on identifying the objects. Further, during video editing, a video processing device may attempt to identify objects in a video; segment the video based on identifying the objects; and edit the video to remove the objects, to alter the objects, to insert the objects into another video, and/or the like. Similarly, during audio editing, an audio processing device may attempt to identify component sounds in an audio clip; segment the audio clip based on identifying the component sounds; and edit the audio to remove the component sounds, to alter the component sounds, to insert the component sounds into another audio clip, and/or the like.

However, some images or other media may be associated with poor image quality, such as low resolution, low light, poor contrast, poor sharpness, and/or the like. For example, user devices may include inexpensive cameras to reduce size and/or cost, which may prevent the user devices from obtaining images associated with a sufficient image quality to accurately perform facial recognition. Similarly, objects may be positioned a threshold distance from an autonomous vehicle, which may result in poor image quality of video of an object, thereby preventing the autonomous vehicle from identifying the object. In this case, when the vehicle is moving at a threshold speed, by the time the object is within a threshold distance associated with sufficient image quality to identify the object, the vehicle may lack sufficient time to avoid the object.

Some implementations, described herein, provide image processing for object identification. For example, an object identification platform may use a generative adversarial networks (GANs) technique to enhance image quality for an image, thereby enabling optimization of an object recognition procedure. Moreover, the object identification platform may use deep reinforcement learning to automate optimization of an image quality enhancement procedure and an object recognition procedure. In this way, the object identification platform may improve an accuracy of object identification for image processing relative to other techniques for image processing.

Moreover, based on enabling automated image quality enhancement for object recognition, the object identification platform may enable lower quality images to be used for object recognition than when using other techniques, thereby reducing a utilization of bandwidth resources, network resources, and/or the like to transfer images relative to using other techniques that require higher quality images. Moreover, the object identification platform may reduce data storage requirements associated with image processing by enabling use of lower quality images relative to when using other techniques. Furthermore, based on improving an accuracy of object identification in image processing, the object identification platform may enable improved security for biometric applications of object identification (e.g., facial recognition), improved safety for collision avoidance applications of object identification (e.g., autonomous vehicle navigation), and/or the like. Furthermore, based on improving an accuracy of object identification in low quality images, the object identification platform may enable improved image compression algorithms by enabling successful object identification even after image quality is reduced to enable a reduction in an image file size.

Figure 1B:
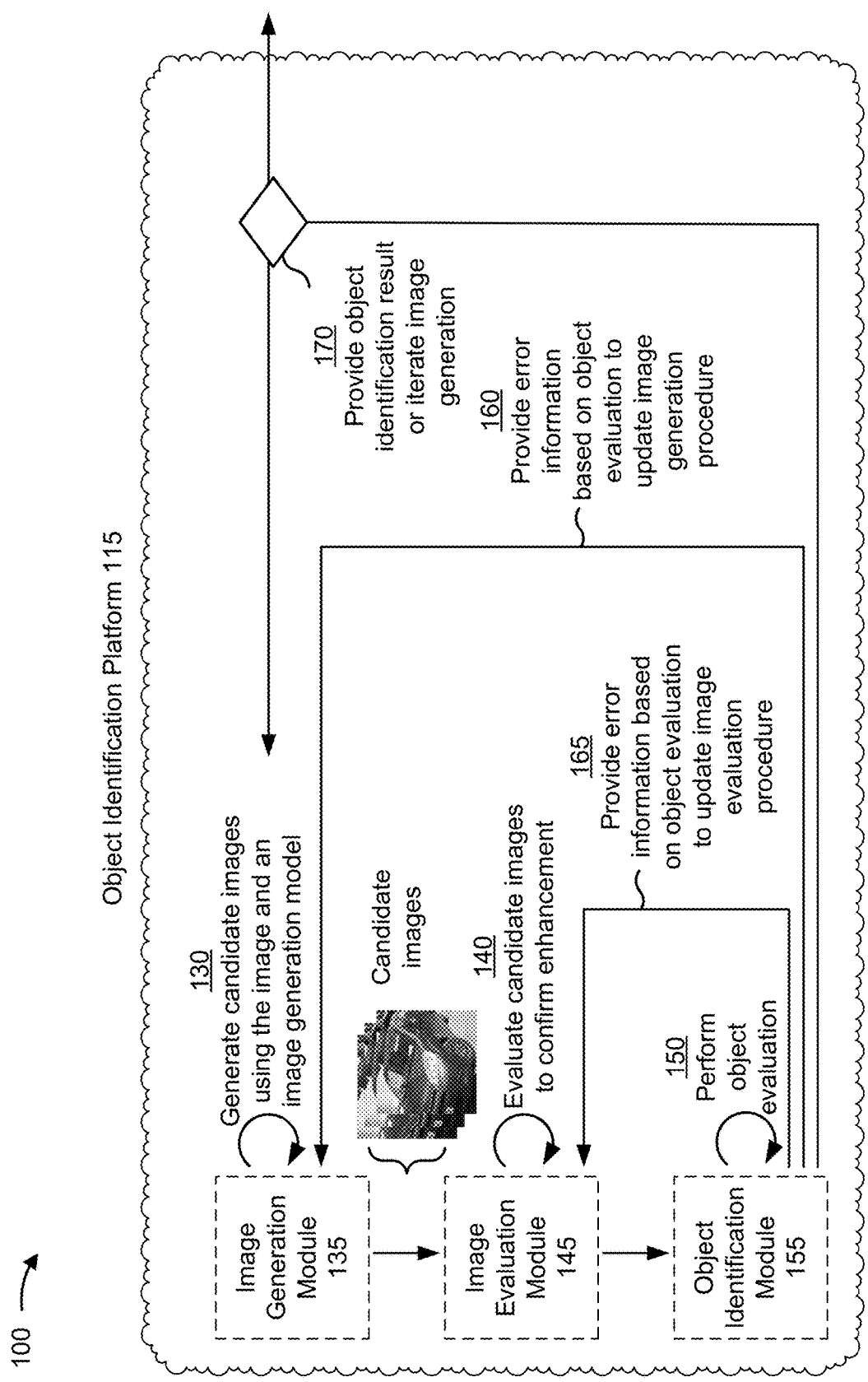
Figure 1C:
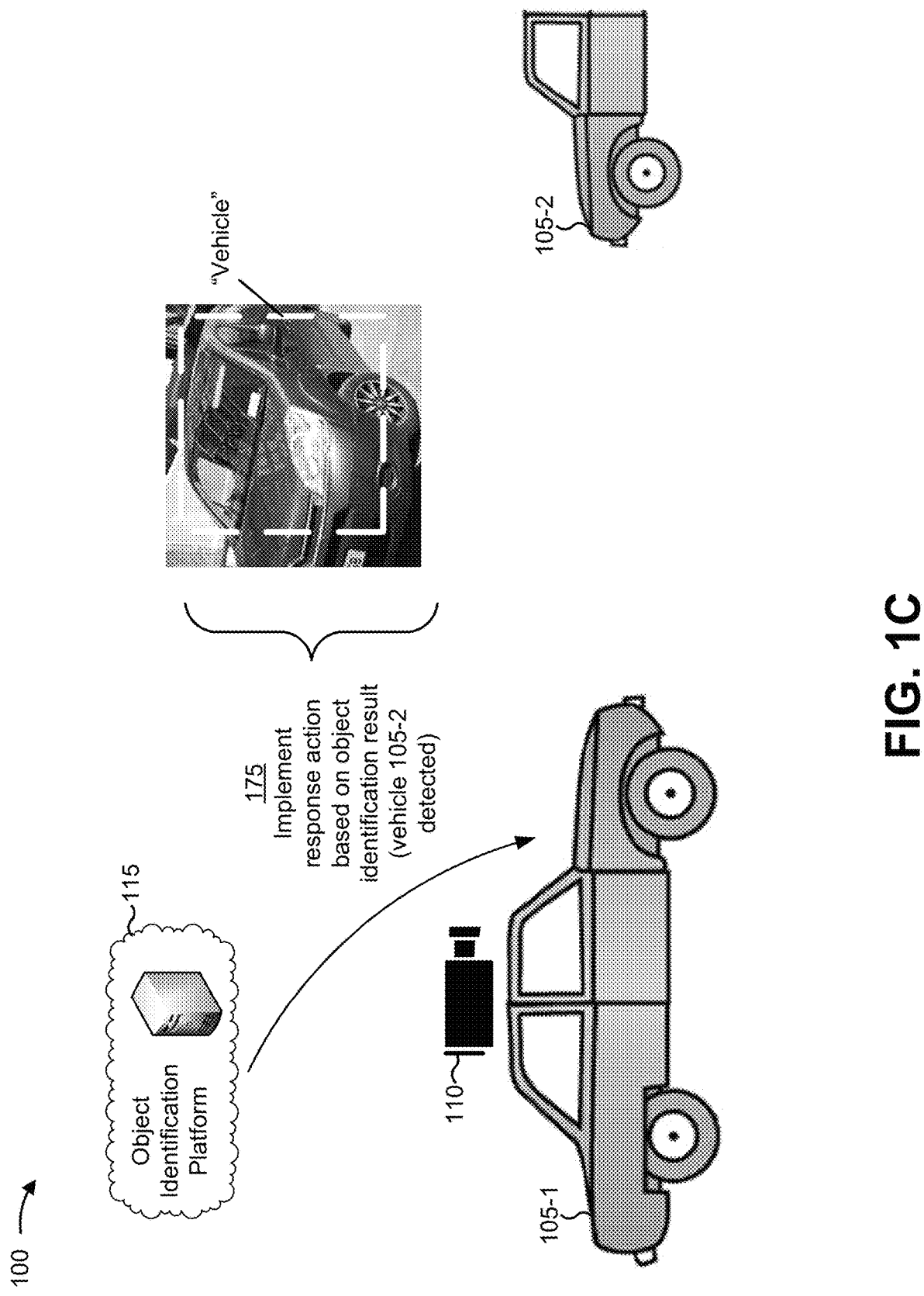

FIGS. 1A-1C are diagrams of an example implementation 100 described herein. As shown in FIG. 1A, example implementation 100 includes a first vehicle 105-1 (e.g., an autonomous vehicle), a second vehicle 105-2, an image capture device 110 (e.g., a camera) of first vehicle 105-1, and an object identification platform 115 (e.g., provided in a cloud computing environment).

As further shown in FIG. 1A, and by reference number 120, image capture device 110 of first vehicle 105-1 may capture an image of an object. For example, image capture device 110 may capture an image that depicts second vehicle 105-2. In some implementations, image capture device 110 may capture a still image. For example, image capture device 110 may be a camera that captures still images. Additionally, or alternatively, image capture device 110 may capture another type of media, such as a video, an audio recording, a three-dimensional image, a virtual reality representation, or another type of data for processing. In some implementations, image capture device 110 may capture the image based on a request. For example, object identification platform 115 may indicate a threshold level of image quality for which object identification platform 115 is configured to successfully perform object identification, and may request that image capture device 110 capture an image satisfying the threshold level of image quality (e.g., which may be a low resolution image). In this way, object identification platform 115 may reduce a utilization of memory resources to store an image, a utilization of network resources to transmit the true image, and/or the like.

In some implementations, the image may include a particular feature that is to be identified. For example, image capture device 110 may capture an image of a biometric feature, such as a face, a handprint, a fingerprint, a gait, and/or the like. Additionally, or alternatively, image capture device 110 may capture an image of an object. Additionally, or alternatively, image capture device 110 may capture an image of a message, such as a textual message, a numerical message, and/or the like. In some implementations, image capture device 110 may capture an image of multiple objects, multiple biometric features, multiple messages, and/or the like.

As further shown in FIG. 1A, and by reference number 125, image capture device 110 may provide the image, which may be termed a true image, for object identification. For example, image capture device 110 may provide the true image that depicts second vehicle 105-2 to object identification platform 115, to enable object identification platform 115 to determine that vehicle 105-2 is depicted in the true image (e.g., to enable first vehicle 105-1 to avoid second vehicle 105-2). In some implementations, object identification platform 115 may obtain a true image or another media associated with a particular image quality. For example, object identification platform 115 may request, and may receive a low-quality version of the true image, and may process the low-quality version of the true image to perform object identification, thereby reducing a utilization of memory resources, network resources, and/or the like relative to using a high-quality version of the true image (e.g., a version of the true image with larger file size). In some implementations, object identification platform 115 may obtain a portion of information captured by image capture device 110. For example, object identification platform 115 may obtain a frame of a video captured by image capture device 110, and may perform object identification on the frame of the video. Additionally, or alternatively, object identification platform 115 may obtain multiple frames of the video, may obtain the video, and/or the like to perform object identification.

As shown in FIG. 1B, and by reference number 130, based on receiving the true image, an image generation module 135, which may be a generator for a generative adversarial networks (GANs) modeling technique, of object identification platform 115 may generate candidate images using the true image and an image generation model. In this case, the candidate images may be images generated using the image generation model with an improved image quality relative to the true image, such that object identification is performable on the true image, as described in more detail below. For example, object identification platform 115 may use the image generation model to alter the true image to generate at least one candidate image associated with an improved image quality characteristic. In this case, the image quality characteristic may include an improved image resolution, contrast, sharpness, brightness, and/or the like.

As further shown in FIG. 1B, and by reference number 140, based on receiving the candidate images, an image evaluation module 145, which may be a discriminator for the GANs modeling technique, of object identification platform 115 may evaluate the candidate images to confirm enhancement. In this case, image evaluation module 145 may attempt to determine, using an image evaluation model, whether a candidate image, of the candidate images, or the true image was generated by image generation module 135, which may enable image evaluation module 145 to determine that the candidate images are associated with improved image quality relative to the true image. In this way, image evaluation module 145 confirms that image generation module 135 has generated candidate images with improved image quality relative to the true image, as described in more detail below, (e.g., the candidate images satisfy a threshold improvement with regard to image quality). Based on determining that the candidate images are associated with improved image quality, image evaluation module 145 may provide the candidate images and the true image for object identification. In contrast, based on determining that the candidate images are not associated with improved image quality, image evaluation module 145 may cause image generation module 135 to update the image generation model, and to generate another candidate image.

As further shown in FIG. 1B, and by reference number 150, based on evaluating the candidate images, an object identification module 155 of object identification platform 115 may perform object evaluation using the candidate images and the true image. For example, object identification module 155 may identify one or more features of the candidate images, such as one or more objects in the candidate images, using an object identification model. In this way, object identification module 155 performs an object evaluation on an improved quality candidate image generated based on a true image to enable improved determination of a feature of the true image relative to performing an object evaluation on the true image.

In some implementations, object identification platform 115 may generate the object identification model for use in performing the object evaluation. For example, object identification platform 115 may perform a data acquisition procedure, a data pre-processing procedure, and/or a model processing procedure to generate the object identification model. In some implementations, object identification platform 115 may obtain an images data set to perform the data acquisition procedure. For example, object identification platform 115 may obtain hundreds, thousands, millions, or billions of images and metadata associated with the images identifying features of the images. In some implementations, object identification platform 115 may segment the images data set into multiple data sets to perform the data pre-processing procedure. For example, object identification platform 115 may segment the images data set into an images training data set, an images testing data set, an images validation data set, and/or the like. Additionally, or alternatively, object identification platform 115 may remove one or more data points from the images data set. For example, object identification platform 115 may determine that the images data set includes images of a set of houses (e.g., based on the metadata), and may determine to remove the images of the set of houses from an images data set that is to be used to train the object identification model to perform facial recognition (i.e., to identify facial features). In this way, object identification platform 115 may reduce a utilization of processing resources associated with training the image identification model relative to training the image identification model using images of features that the image identification model will not be used to identify.

In some implementations, object identification platform 115 may train the image identification model using, for example, the images training data set (e.g., as training data to train the model) and the images testing data set (e.g., as testing data to test the model), and may validate the image identification model using, for example, the images validation data set (e.g., as validation data to validate the model). In this case, object identification platform 115 may generate the image identification model by assigning weights to image features, and iteratively changing the weights to achieve a threshold level of modeling accuracy in assigning a label to an image feature in an image. For example, object identification platform 115 may generate a graph representation of a set of features, determine weights for a matching algorithm to determine many-to-many correspondences between nodes of the graph representation, and/or the like to generate a model for matching a feature of a particular image (e.g., a characteristic of a set of pixels, such as a color, a spacing, a shape, and/or the like) to a label that is to describe the particular image (e.g., a label indicating that the particular image includes an automobile, a face, a particular person's face, and/or the like). In this way, object identification platform 115 generates the image identification model to use in analyzing the candidate images to determine a feature of the true image.

In some implementations, object identification platform 115 may determine an embedding value for a candidate image and the true image using the image identification model. The embedding value may represent a location of a particular image in the image identification model with regard to semantic features of the particular image calculated using the image identification model. For example, object identification platform 115 may determine a first embedding for the true image using the image identification model, and may determine a second embedding for a candidate image using the image identification model. In some implementations, object identification platform 115 may determine an embeddings error for the first embedding and the second embedding. For example, object identification platform 115 may compare the first embedding to the second embedding to determine the embedding error, which represents a difference or distance (e.g., a graph distance with respect to a graph representation of the object identification model) and which may be termed an embedding distance, between the first embedding and the second embedding. In this way, object identification platform 115 uses the image identification model to determine an extent to which image quality is changed in the candidate image relative to the true image, thereby enabling a feedback loop for the image generation model and the image evaluation model, as described in more detail herein. In some implementations, object identification platform 115 may receive a set of historical high resolution images (e.g., a higher resolution than one or more candidate images), and may compare the set of historical high resolution images to the one or more candidate images using the image evaluation model to determine whether image quality is improved in the one or more candidate images relative to the true image.

As further shown in FIG. 1B, and by reference number 160, object identification module 155 may provide, to image generation module 135, error information based on the object evaluation to update an image generation procedure associated with the image generation model. For example, object identification platform 115 may backpropagate embeddings values, such as the first embedding, the second embedding, the embedding error, and/or the like to update the image generation model. In this case, object identification platform 115 uses the first embedding and the second embedding to feed into the image generation model to cause the image generation model to learn to generate candidate images with improved image quality relative to the true image with regard to an ability of object identification platform 115 to identify objects in the candidate images using the image identification model. In other words, object identification platform 115 uses the embeddings values as input to improve an ability of object identification platform 115 to use the image generation model to purposefully mislead object identification platform 115 using the image evaluation model, as described herein. In this way, based on using the error information to update the image generation model, the image generation model is improved over time, thereby improving accuracy of object identification performed by object identification platform 115.

As further shown in FIG. 1B, and by reference number 165, object identification module 155 may provide, to image evaluation module 145, error information based on the object evaluation to update an image evaluation procedure associated with the image evaluation model. For example, when the embedding error is less than a threshold, object identification platform 115 may use the embedding error as an inverse reward for reinforcement learning associated with the image evaluation model used by image evaluation module 145. In this case, the embedding error being less than a threshold may indicate that image evaluation module 145 incorrectly determined that image generation module 135 improved image quality in the candidate image relative to the true image (e.g., image generation module 135 used the image generation model to purposefully mislead image evaluation module 145 using the image evaluation model). Based on providing the inverse reward, object identification platform 115 may update the image evaluation model to more accurately discriminate between the true image and the candidate image, thereby improving a likelihood that image evaluation module 145 rejects a candidate image that does not improve image quality relative to the true image. Based on improving a likelihood that image evaluation module 145 rejects candidate images that do not improve image quality relative to the true image, object identification platform 115 causes a feedback loop that increases a likelihood that image generation module 135 generates a candidate image that improves image quality relative to the true image. In this way, based on using the error information to update the image evaluation model, the image evaluation model is improved over time, thereby improving the image generation model, and improving accuracy of object identification performed by object identification platform 115.

In some implementations, object identification platform 115 may perform a model pre-training procedure to train the image generation model and the image evaluation model. For example, before the image generation model and the image evaluation model are used to generate candidate images and evaluate the candidate images for use in controlling an autonomous vehicle, object identification platform 115 may obtain an images data set, as described above with regard to the object identification model, and may attempt to perform object identification on the images data set to generate error information as feedback for training the image generation model and the image evaluation model. In this case, based on obtaining an images data set of thousands, millions, or billions of images, object identification platform 115 may automatically train image quality enhancement for use in object identification without human intervention, thereby reducing a utilization of computing resources relative to requiring human confirmation of whether an image is correctly enhanced with regard to image quality, without requiring human confirmation of successful object identification, and/or the like which may be highly resource intensive.

As further shown in FIG. 1B, and by reference number 170, object identification module 155 may selectively provide an object identification result or may iterate image generation. For example, based on the error value not satisfying a threshold (e.g., the error value being greater than or equal to a threshold value), object identification platform 115 may iterate image generation, image evaluation, and object identification. For example, object identification platform 115 may use an updated image generation model (e.g., updated using the error information) to generate new candidate images, an updated image evaluation model (e.g., updated using the error information) to evaluate the new candidate images, and the object identification model to identify a feature of the new candidate images. Additionally, or alternatively, based on the error value satisfying the threshold (e.g., the error value being less than the threshold value), object identification platform 115 may provide information identifying a feature of the true image identified using the object identification model.

As shown in FIG. 1C, and by reference number 175, object identification platform 115 may implement a response action based on the object identification result. For example, object identification platform 115 may provide a user interface identifying the feature of the true image (e.g., indicating that vehicle 105-2 is detected within a threshold proximity of vehicle 105-1). Additionally, or alternatively, object identification platform 115 may automatically cause vehicle 105-1 to be controlled to avoid the feature of the true image (e.g., to avoid vehicle 105-2), thereby improving autonomous vehicle safety and operation. Additionally, or alternatively, in another context, object identification platform 115 may unlock a user device based on identifying the feature as a face of an authorized user of a user device, thereby improving user device security, operation, and/or the like.

Additionally, or alternatively, object identification platform 115 may transmit a notification associated with the feature, such as a notification identifying an identified person, identifying an identified vehicle, and/or the like as having arrived at a particular location. Additionally, or alternatively, object identification platform 115 may transmit a media segment. For example, in an image editing context, a video editing context, an audio editing context, and/or the like, object identification platform 115 may automatically edit a media item to generate layers representing the feature (e.g., an object, a sound, and/or the like identified in the media item), a background (e.g., a portion of the media item not associated with the identified feature), and/or the like. In this way, object identification platform 115 may reduce a computing utilization associated with media editing by avoiding time-consuming, error-prone, and resource intensive human-operated tagging of features in media, generating of layers in media, and/or the like.

In this way, object identification platform 115 improves image quality with respect to an ability of object identification module 155 to identify a feature of the image by using the image generation model and the image evaluation model as adversarial models of the GANs modeling technique. As a result of applying the GANs modeling technique for computerized object identification, in some implementations, a candidate image, if visually inspected, may appear to be of lower quality to the human eye relative to a corresponding true image. For example, based on using the GANs modeling technique, improvements in image quality are with respect to object identification, not with respect to human inspection. In other words, object identification platform 115 may blur a true image, which would make identification of an object more difficult for a human, but may thereby improve an accuracy of computerized object identification, reducing a processing utilization to successfully complete computerized object identification, enabling computerized object identification to be performed with reduced network traffic and/or reduced memory utilization, and/or the like.

As indicated above, FIGS. 1A-1C are provided merely as an example. Other examples are possible and may differ from what was described with regard to FIGS. 1A-1C.

Figure 2:
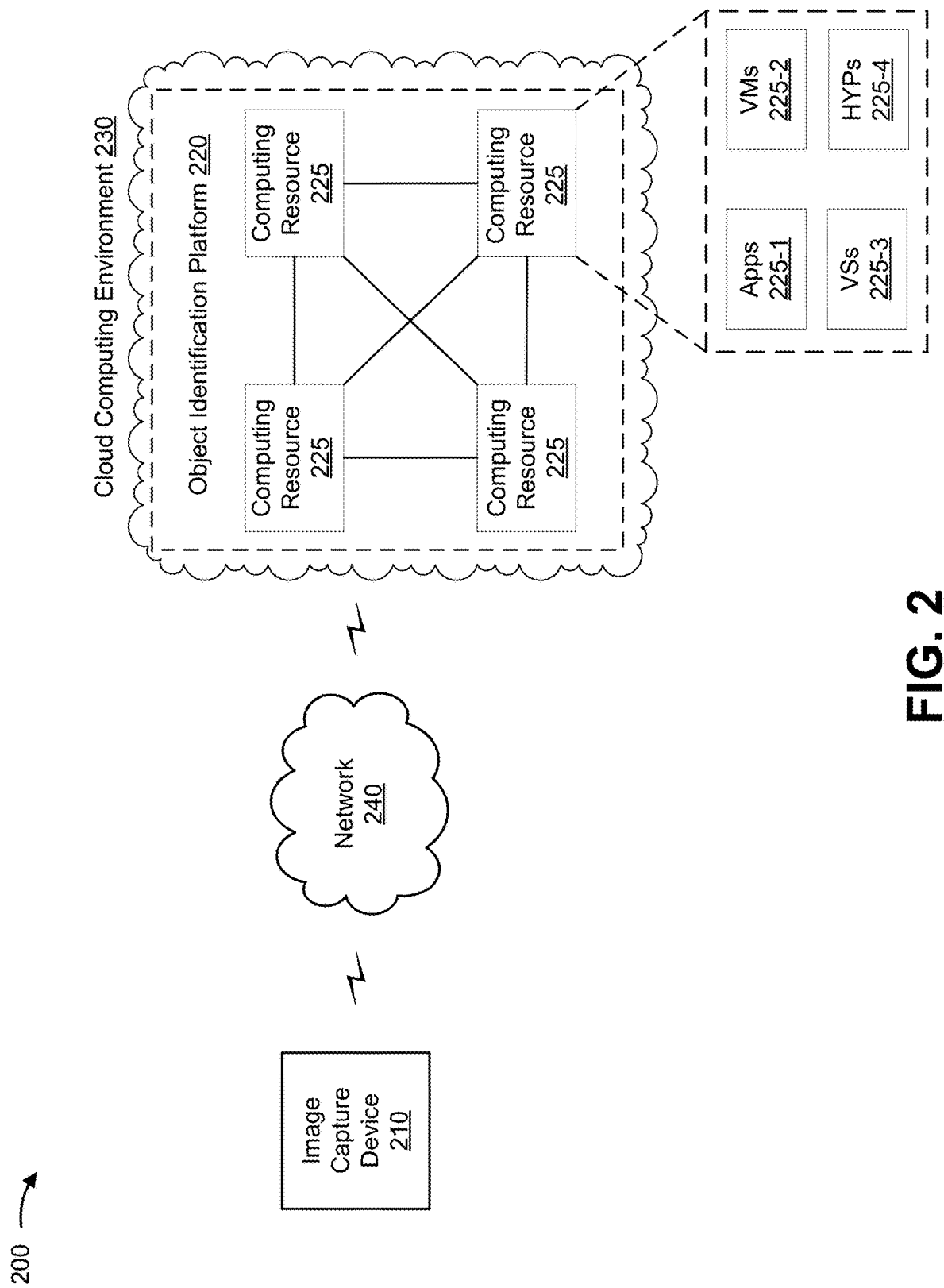
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an image capture device 210, an object identification platform 220, a computing resource 225, a cloud computing environment 230, and a network 240. Devices of environment 200 may interconnect via wired connections, wireless connections, or a combination of wired and wireless connections.

Image capture device 210 includes one or more devices capable of receiving, generating, storing, processing, and/or providing information associated with image capture. For example, image capture device 210 may include an image camera, an image sensor, a video camera, a microphone, a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, image capture device 210 may transmit image data associated with an image to object identification platform 220. In some implementations, image capture device 210 may alter an image before transmitting image data associated with the true image to object identification platform 220. For example, image capture device 210 may compress the true image to reduce a file size, thereby reducing a utilization of network resources and/or bandwidth resources, and may transmit image data associated with the compressed image to object identification platform 220, which may process the true image data to perform object identification on the compressed image.

Object identification platform 220 includes one or more computing resources assigned to process an image to perform an object identification on the true image. For example, object identification platform 220 may be a platform implemented by cloud computing environment 230 that may determine an object included in an image, and may provide a control command associated with unlocking a user device, directing an autonomous vehicle, and/or the like. In some implementations, object identification platform 220 is implemented by computing resources 225 of cloud computing environment 230.

In some implementations, object identification platform 220 may be designed to be modular such that certain software components may be swapped in or out depending on a particular need. As such, object identification platform 220 may be easily and/or quickly reconfigured for different uses. In some implementations, object identification platform 220 may receive information from and/or transmit information to one or more image capture devices 210. Notably, while implementations described herein describe object identification platform 220 as being hosted in cloud computing environment 230, in some implementations, object identification platform 220 may not be cloud-based (i.e., may be implemented outside of a cloud computing environment) or may be partially cloud-based.

Cloud computing environment 230 includes an environment that delivers computing as a service, whereby shared resources, services, etc. may be provided to process an image, such as to perform object identification. Cloud computing environment 230 may provide computation, software, data access, storage, and/or other services that do not require end-user knowledge of a physical location and configuration of a system and/or a device that delivers the services. As shown, cloud computing environment 230 may include object identification platform 220 and computing resource 225.

Computing resource 225 includes one or more personal computers, workstation computers, server devices, or another type of computation and/or communication device. In some implementations, computing resource 225 may host object identification platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by image capture device 210. Application 225-1 may eliminate a need to install and execute the software applications on image capture device 210. For example, application 225-1 may include software associated with object identification platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., image capture device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
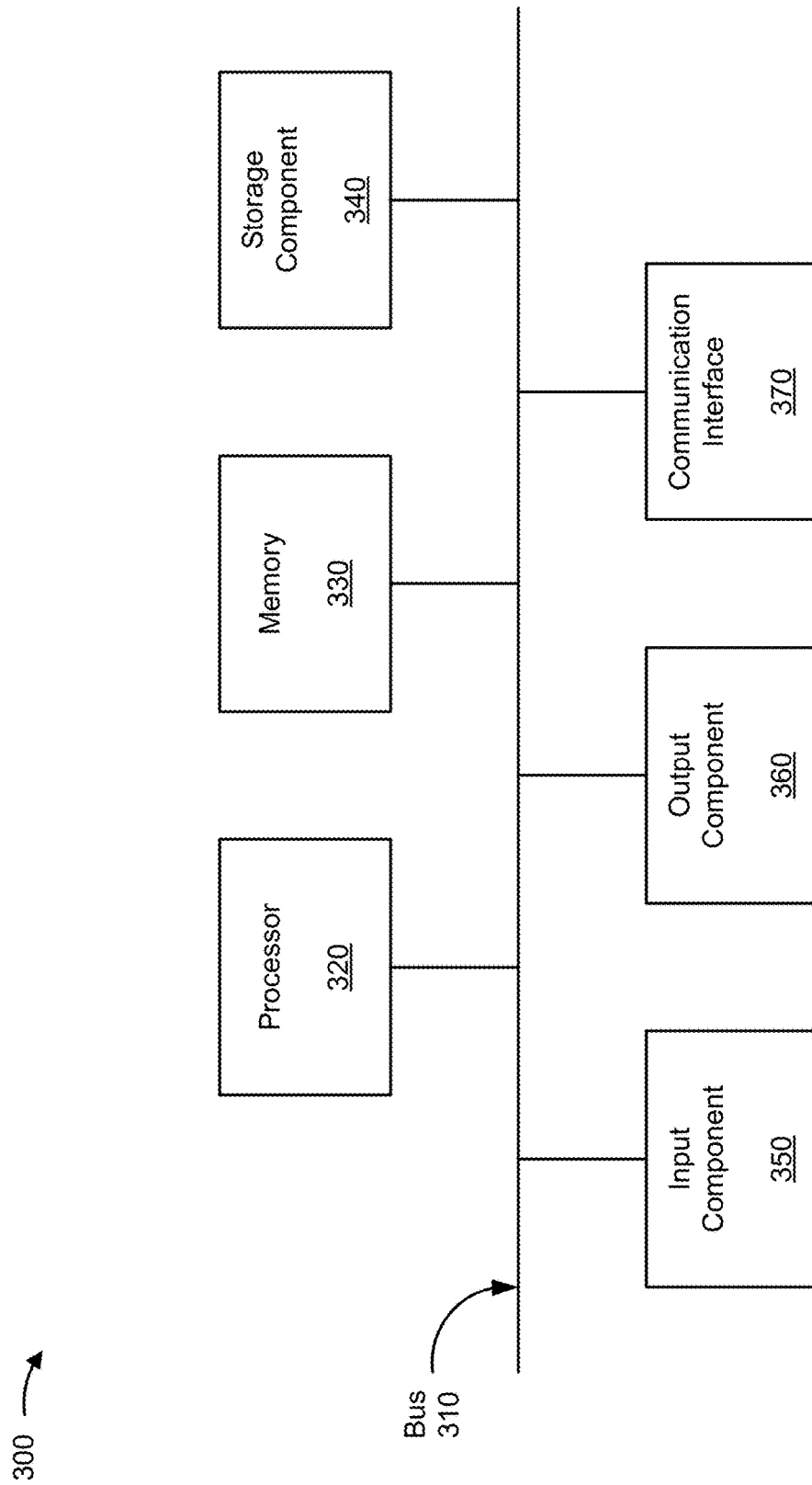
FIG. 3 is a diagram of example components of one or more devices of FIG. 2.

FIG. 3 is a diagram of example components of a device 300. Device 300 may correspond to image capture device 210, object identification platform 220, and/or computing resource 225. In some implementations, image capture device 210, object identification platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
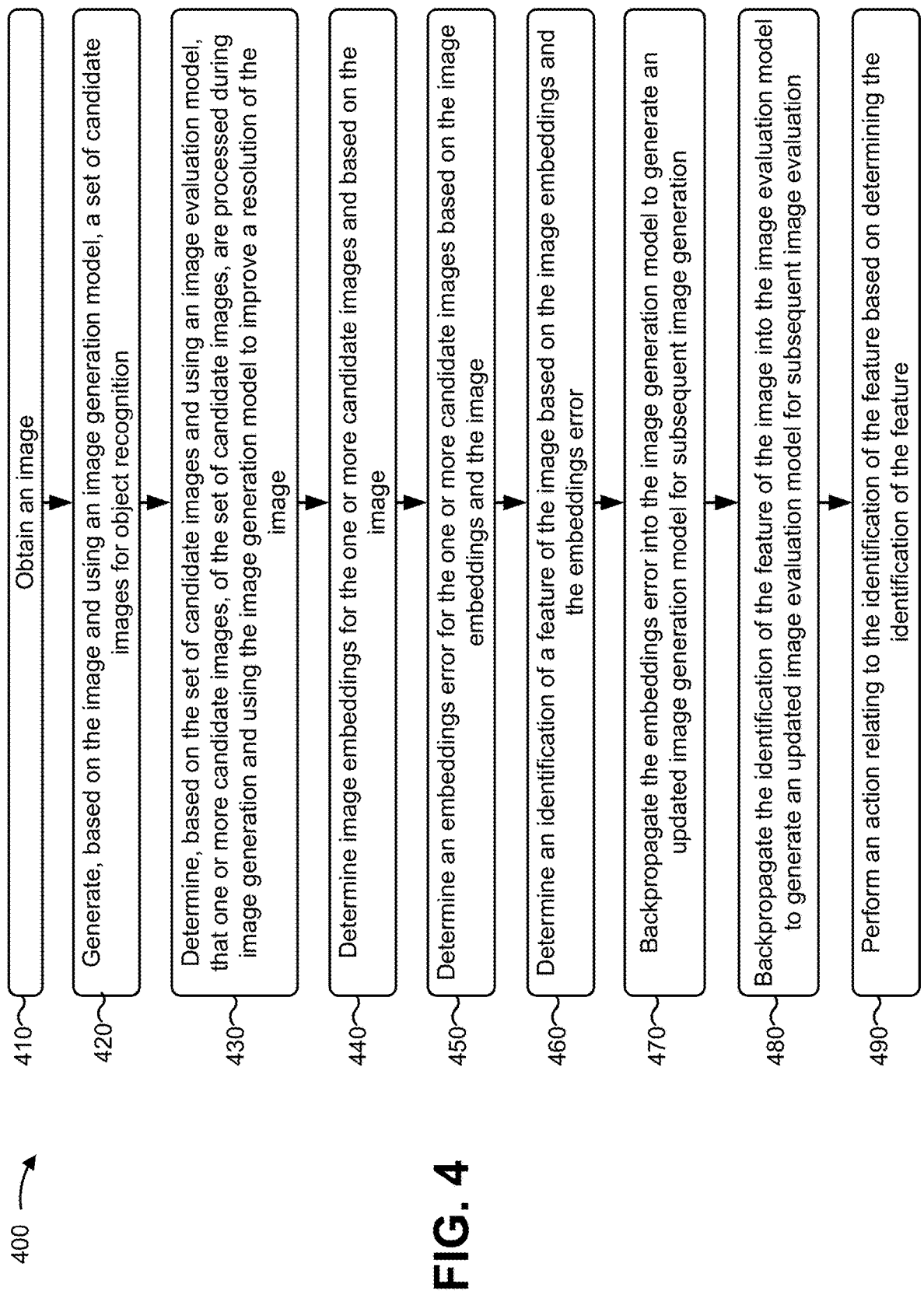
FIGS. 4-6 are flow charts of example processes for processing an image to perform object recognition.

FIG. 4 is a flow chart of an example process 400 for processing an image to perform object recognition. In some implementations, one or more process blocks of FIG. 4 may be performed by an object identification platform (e.g. object identification platform 220). In some implementations, one or more process blocks of FIG. 4 may be performed by another device or a group of devices separate from or including the object identification platform (e.g. object identification platform 220), such as an image capture device (e.g. image capture device 210) and/or a computing resource (e.g. computing resource 225).

As shown in FIG. 4, process 400 may include obtaining an image (block 410). For example, the object identification platform (e.g., using computing resource 225, processor 320, memory 330, storage component 340, input component 350, communication interface 370, and/or the like) may obtain an image, as described above in connection with FIGS. 1A-1C.

As further shown in FIG. 4, process 400 may include generating, based on the image and using an image generation model, a set of candidate images for object recognition (block 420). For example, the object identification platform (e.g., using computing resource 225, processor 320, memory 330, storage component 340, output component 360, communication interface 370, and/or the like) may generate, based on the image and using an image generation model, a set of candidate images for object recognition, as described above in connection with FIGS. 1A-1C.

As further shown in FIG. 4, process 400 may include determining, based on the set of candidate images and using an image evaluation model, that one or more candidate images, of the set of candidate images, are processed during image generation and using the image generation model to improve a resolution of the image (block 430). For example, the object identification platform (e.g., using computing resource 225, processor 320, memory 330, storage component 340, and/or the like) may determine, based on the set of candidate images and using an image evaluation model, that one or more candidate images, of the set of candidate images, are processed during image generation and using the image generation model to improve a resolution of the image, as described above in connection with FIGS. 1A-1C.

As further shown in FIG. 4, process 400 may include determining image embeddings for the one or more candidate images and based on the image (block 440). For example, the object identification platform (e.g., using computing resource 225, processor 320, memory 330, storage component 340, and/or the like) may determine image embeddings for the one or more candidate images and based on the image, as described above in connection with FIGS. 1A-1C.

As further shown in FIG. 4, process 400 may include determining an embeddings error for the one or more candidate images based on the image embeddings and the image (block 450). For example, the object identification platform (e.g., using computing resource 225, processor 320, memory 330, storage component 340, and/or the like) may determine an embeddings error for the one or more candidate images based on the image embeddings and the image, as described above in connection with FIGS. 1A-1C.

As further shown in FIG. 4, process 400 may include determining an identification of a feature of the image based on the image embeddings and the embeddings error (block 460). For example, the object identification platform (e.g., using computing resource 225, processor 320, memory 330, storage component 340, and/or the like) may determine an identification of a feature of the image based on the image embeddings and the embeddings error, as described above in connection with FIGS. 1A-1C.

As further shown in FIG. 4, process 400 may include backpropagating the embeddings error into the image generation model to generate an updated image generation model for subsequent image generation (block 470). For example, the object identification platform (e.g., using computing resource 225, processor 320, memory 330, storage component 340, input component 350, output component 360, communication interface 370, and/or the like) may backpropagate the embeddings error into the image generation model to generate an updated image generation model for subsequent image generation, as described above in connection with FIGS. 1A-1C.

As further shown in FIG. 4, process 400 may include backpropagating the identification of the feature of the image into the image evaluation model to generate an updated image evaluation model for subsequent image evaluation (block 480). For example, the object identification platform (e.g., using computing resource 225, processor 320, memory 330, storage component 340, input component 350, output component 360, communication interface 370, and/or the like) may backpropagate the identification of the feature of the image into the image evaluation model to generate an updated image evaluation model for subsequent image evaluation, as described above in connection with FIGS. 1A-1C.

As further shown in FIG. 4, process 400 may include performing an action relating to the identification of the feature based on determining the identification of the feature (block 490). For example, the object identification platform (e.g., using computing resource 225, processor 320, memory 330, storage component 340, input component 350, output component 360, communication interface 370, and/or the like) may perform an action relating to the identification of the feature based on determining the identification of the feature, as described above in connection with FIGS. 1A-1C.

Process 400 may include additional implementations, such as any single implementation or any combination of implementations described below and/or in connection with one or more other processes described elsewhere herein.

In some implementations, the object identification platform may use the updated image generation model to generate another set of candidate images based on another image, and may determine another identification of another feature of the other image based on the other set of candidate images.

In some implementations, the object identification platform may use the updated image evaluation model to evaluate another one or more candidate images relating to another image, and may determine another identification of another feature of the other image based on the other one or more candidate images.

In some implementations, the object identification platform may determine that the embeddings error does not satisfy a threshold, and may iterate, based on determining that the embeddings error does not satisfy the threshold, image generation and image evaluation using a result of determining the image embeddings and the embeddings error to determine another image embeddings and another embeddings error. In some implementations, when determining the identification of the feature of the image, the object identification platform may determine the identification of the feature of the image based on the other image embeddings and the other embeddings error.

In some implementations, the action may be associated with causing an autonomous vehicle to be controlled. In some implementations, when performing the action relating to the identification of the feature, the object identification platform may communicate with another device to provide a command relating to altering functioning of the other device based on the identification of the feature.

In some implementations, the feature of the image may be a biometric feature, an object, an image segment, and/or a message. In some implementations, the image evaluation model may be a deep reinforcement learning model. In some implementations, the image generation model may be a generative adversarial networks (GANs) model. In some implementations, the image may be at least one frame of a video recording. In some implementations, the image comprises a low resolution image. In some implementations, the object identification platform may receive a set of historical high resolution images, and may compare the one or more candidate images to the historical high resolution images.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
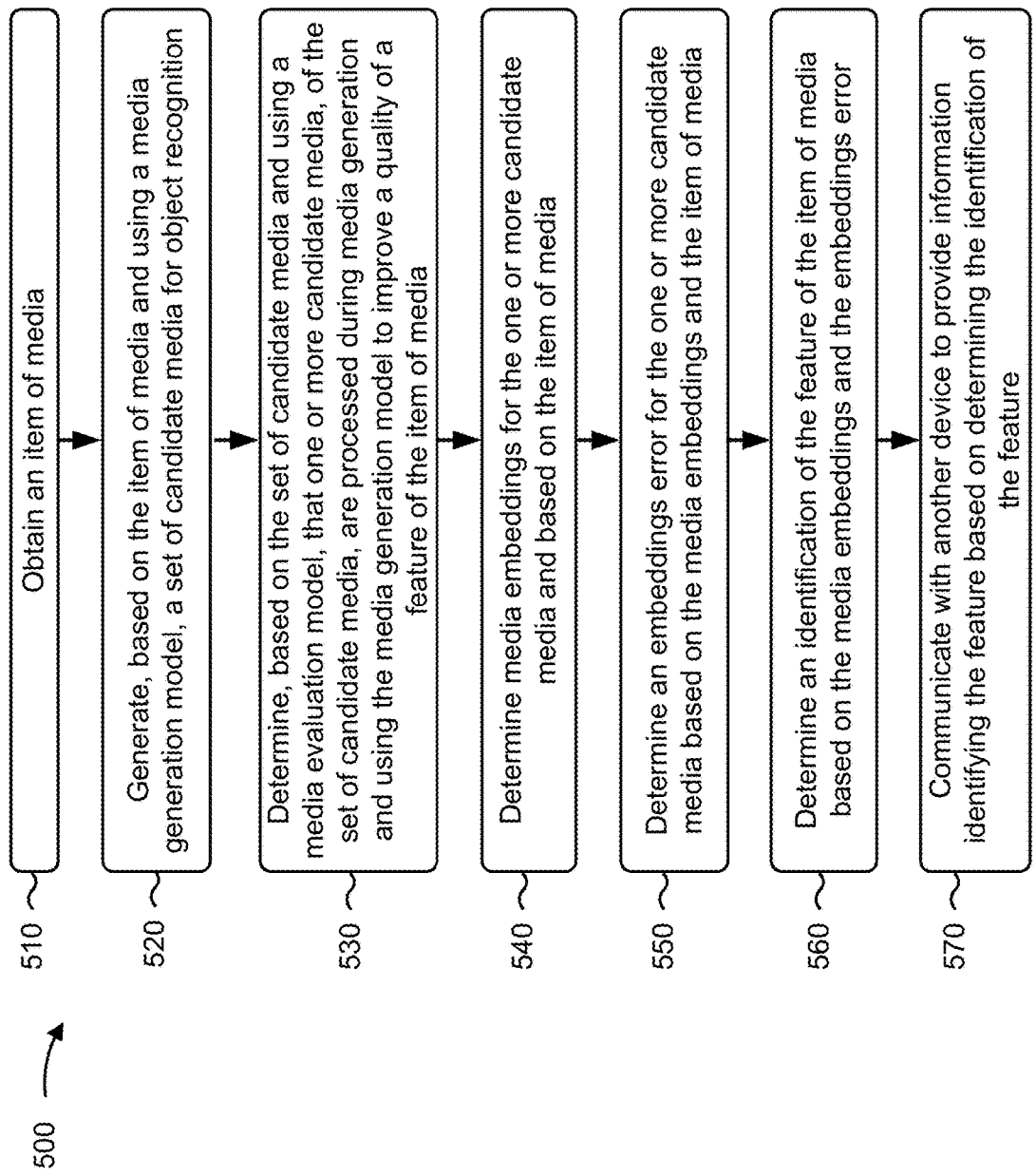

FIG. 5 is a flow chart of an example process 500 for processing an image to perform object recognition. In some implementations, one or more process blocks of FIG. 5 may be performed by an object identification platform (e.g. object identification platform 220). In some implementations, one or more process blocks of FIG. 5 may be performed by another device or a group of devices separate from or including the object identification platform (e.g. object identification platform 220), such as an image capture device (e.g. image capture device 210) and/or a computing resource (e.g. computing resource 225).

As shown in FIG. 5, process 500 may include obtaining an item of media (block 510). For example, the object identification platform (e.g., using computing resource 225, processor 320, memory 330, storage component 340, input component 350, communication interface 370, and/or the like) may obtain an item of media, as described above in connection with FIGS. 1A-1C.

As further shown in FIG. 5, process 500 may include generating, based on the item of media and using a media generation model, a set of candidate media for object recognition (block 520). For example, the object identification platform (e.g., using computing resource 225, processor 320, memory 330, storage component 340, output component 360, communication interface 370, and/or the like) may generate, based on the item of media and using a media generation model, a set of candidate media for object recognition, as described above in connection with FIGS. 1A-1C.

As further shown in FIG. 5, process 500 may include determining, based on the set of candidate media and using a media evaluation model, that one or more candidate media, of the set of candidate media, are processed during media generation and using the media generation model to improve a quality of a feature of the item of media (block 530). For example, the object identification platform (e.g., using computing resource 225, processor 320, memory 330, storage component 340, and/or the like) may determine, based on the set of candidate media and using a media evaluation model, that one or more candidate media, of the set of candidate media, are processed during media generation and using the media generation model to improve a quality of a feature of the item of media, as described above in connection with FIGS. 1A-1C.

As further shown in FIG. 5, process 500 may include determining media embeddings for the one or more candidate media and based on the item of media (block 540). For example, the object identification platform (e.g., using computing resource 225, processor 320, memory 330, storage component 340, and/or the like) may determine media embeddings for the one or more candidate media and based on the item of media, as described above in connection with FIGS. 1A-1C.

As further shown in FIG. 5, process 500 may include determining an embeddings error for the one or more candidate media based on the media embeddings and the item of media (block 550). For example, the object identification platform (e.g., using computing resource 225, processor 320, memory 330, storage component 340, and/or the like) may determine an embeddings error for the one or more candidate media based on the media embeddings and the item of media, as described above in connection with FIGS. 1A-1C.

As further shown in FIG. 5, process 500 may include determining an identification of the feature of the item of media based on the media embeddings and the embeddings error (block 560). For example, the object identification platform (e.g., using computing resource 225, processor 320, memory 330, storage component 340, input component 350, output component 360, communication interface 370, and/or the like) may determine an identification of the feature of the item of media based on the media embeddings and the embeddings error, as described above in connection with FIGS. 1A-1C.

As further shown in FIG. 5, process 500 may include communicating with another device to provide information identifying the feature based on determining the identification of the feature (block 570). For example, the object identification platform (e.g., using computing resource 225, processor 320, memory 330, storage component 340, input component 350, output component 360, communication interface 370, and/or the like) may communicate with another device to provide information identifying the feature based on determining the identification of the feature, as described above in connection with FIGS. 1A-1C.

Process 500 may include additional implementations, such as any single implementation or any combination of implementations described below and/or in connection with one or more other processes described elsewhere herein.

In some implementations, the item of media may be an image, a video recording, an audio recording, a virtual reality representation, and/or a data representation. In some implementations, the quality of the feature may be a resolution, a sharpness, and/or a contrast. In some implementations, the object identification platform may determine the identification of the feature using a simultaneous localization and mapping (SLAM) object detection procedure. In some implementations, the object identification platform may identify an object in the item of media.

In some implementations, the object identification platform may segment the item of media based on the identification of the feature. In some implementations, when communicating with the other device to provide information identifying the feature, the object identification platform may provide information relating to segmenting the item of media.

In some implementations, when obtaining the item of media, the object identification platform may request a low-resolution version of the item of media. In some implementations, the low-resolution version may be associated with a reduced file-size relative to other versions of the item of media and, when generating the set of candidate media, the object identification platform may generate at least one high-resolution version of the item of media based on the low-resolution version. In some implementations, the at least one high-resolution version may be associated with a higher file-size than the low-resolution version.

Although FIG. 5 shows example blocks of process 400, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
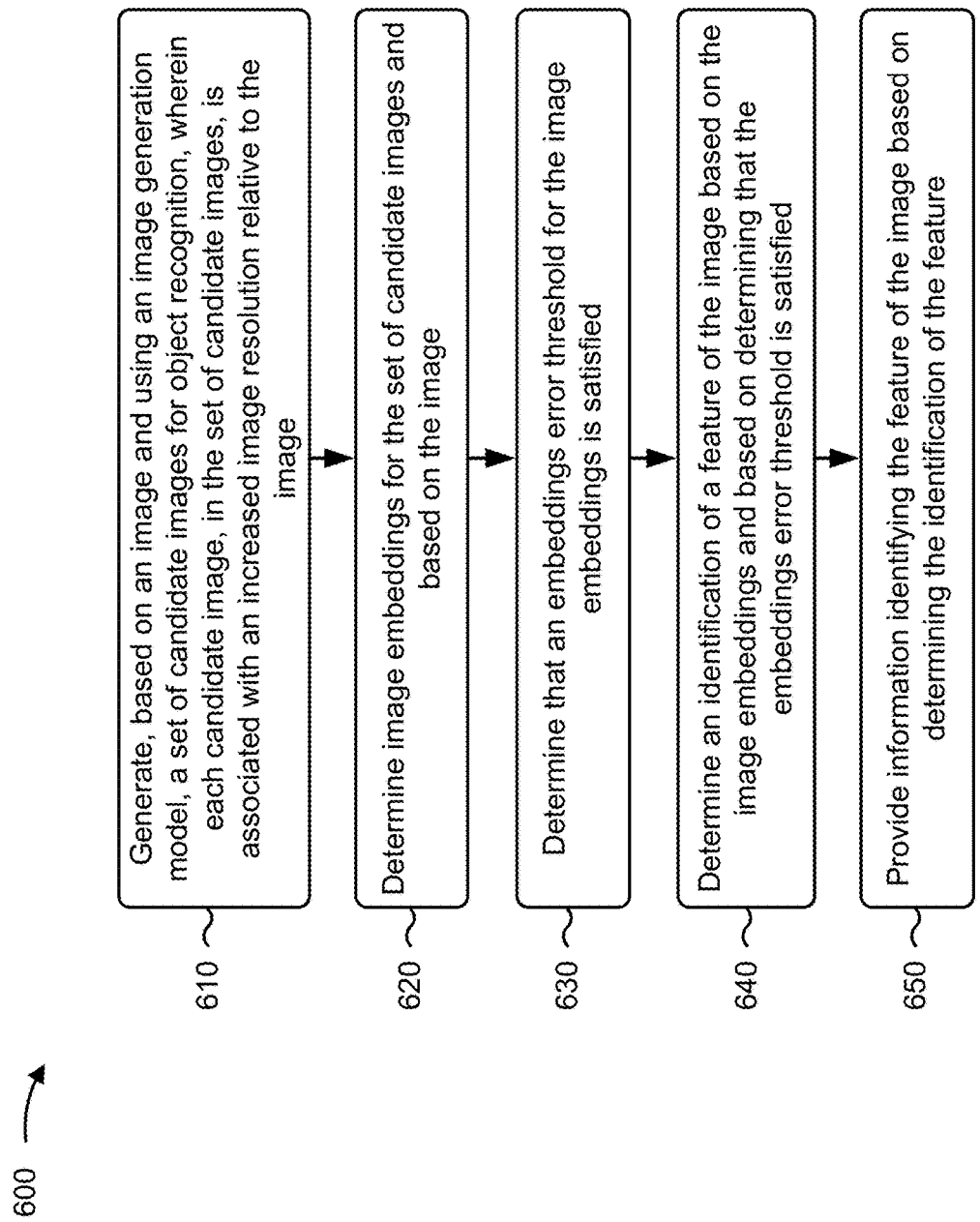

FIG. 6 is a flow chart of an example process 600 for processing an image to perform object recognition. In some implementations, one or more process blocks of FIG. 6 may be performed by an object identification platform (e.g. object identification platform 220). In some implementations, one or more process blocks of FIG. 6 may be performed by another device or a group of devices separate from or including the object identification platform (e.g. object identification platform 220), such as an image capture device (e.g. image capture device 210) and/or a computing resource (e.g. computing resource 225).

As shown in FIG. 6, process 600 may include generating, based on an image and using an image generation model, a set of candidate images for object recognition, wherein each candidate image, in the set of candidate images, is associated with an increased image resolution relative to the image (block 610). For example, the object identification platform (e.g., using computing resource 225, processor 320, memory 330, storage component 340, output component 360, communication interface 370, and/or the like) may generate, based on an image and using an image generation model, a set of candidate images for object recognition, as described above in connection with FIGS. 1A-1C. In some implementations, each candidate image, in the set of candidate images, may be associated with an increased image resolution relative to the image.

As further shown in FIG. 6, process 600 may include determining image embeddings for the set of candidate images and based on the image (block 620). For example, the object identification platform (e.g., using computing resource 225, processor 320, memory 330, storage component 340, and/or the like) may determine image embeddings for the set of candidate images and based on the image, as described above in connection with FIGS. 1A-1C.

As further shown in FIG. 6, process 600 may include determining that an embeddings error threshold for the image embeddings is satisfied (block 630). For example, the object identification platform (e.g., using computing resource 225, processor 320, memory 330, storage component 340, and/or the like) may determine that an embeddings error threshold for the image embeddings is satisfied, as described above in connection with FIGS. 1A-1C.

As further shown in FIG. 6, process 600 may include determining an identification of a feature of the image based on the image embeddings and based on determining that the embeddings error threshold is satisfied (block 640). For example, the object identification platform (e.g., using computing resource 225, processor 320, memory 330, storage component 340, and/or the like) may determine an identification of a feature of the image based on the image embeddings and based on determining that the embeddings error threshold is satisfied, as described above in connection with FIGS. 1A-1C.

As further shown in FIG. 6, process 600 may include providing information identifying the feature of the image based on determining the identification of the feature (block 650). For example, the object identification platform (e.g., using computing resource 225, processor 320, memory 330, storage component 340, output component 360, communication interface 370, and/or the like) may provide information identifying the feature of the image based on determining the identification of the feature, as described above in connection with FIGS. 1A-1C.

Process 600 may include additional implementations, such as any single implementation or any combination of implementations described below and/or in connection with one or more other processes described elsewhere herein.

In some implementations, the object identification platform may use a reinforcement learning based image evaluation module to evaluate the set of candidate images, and may determine that a resolution criterion is satisfied based on evaluating the set of candidate images. In some implementations, when determining the image embeddings, the object identification platform may cause the one or more processors to determine the image embeddings based on determining that the resolution criterion is satisfied. In some implementations, the image may be a video, and the set of candidate images may be a set of frames of the video.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations, described herein, provide image processing for object identification. For example, object identification platform 220 may use a generative adversarial networks (GANs) technique to enhance image quality for an image, thereby enabling optimization of an object recognition procedure. Moreover, object identification platform 220 may use deep reinforcement learning to automate optimization of an image quality enhancement procedure and an object recognition procedure. In this way, object identification platform 220 may improve an accuracy of object identification for image processing relative to other techniques for image processing.

Moreover, based on enabling automated image quality enhancement for object recognition, object identification platform 220 may enable lower quality images to be used for object recognition than when using other techniques, thereby reducing a utilization of bandwidth resources, network resources, and/or the like to transfer images relative to using other techniques that require higher quality images. Moreover, object identification platform 220 may reduce data storage requirements associated with image processing by enabling use of lower quality images relative to when using other techniques. Furthermore, based on improving an accuracy of object identification in image processing, object identification platform 220 may enable improved security for biometric applications of object identification (e.g., facial recognition), improved safety for collision avoidance applications of object identification (e.g., autonomous vehicle navigation), and/or the like. Furthermore, based on improving an accuracy of object identification in low quality images, object identification platform 220 may enable improved image compression algorithms by enabling successful object identification even after image quality is reduced to enable a reduction in an image file size.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      obtain an image;
      generate, based on the image and using an image generation model, a set of candidate images for object recognition;
      determine, based on the set of candidate images and using an image evaluation model, that one or more candidate images, of the set of candidate images, are processed during image generation and using the image generation model to improve a resolution of the image;
      determine image embeddings for the one or more candidate images and based on the image;
      determine an embeddings error for the one or more candidate images based on the image embeddings and the image;
      determine an identification of a feature of the image based on the image embeddings and the embeddings error;
      backpropagate the embeddings error into the image generation model to generate an updated image generation model for subsequent image generation;
      backpropagate the identification of the feature of the image into the image evaluation model to generate an updated image evaluation model for subsequent image evaluation; and
      perform an action relating to the identification of the feature based on determining the identification of the feature.

2. The device of claim 1, wherein the one or more processors are further to:
   use the updated image generation model to generate another set of candidate images based on another image; and
   determine another identification of another feature of the other image based on the other set of candidate images.

3. The device of claim 1, wherein the one or more processors are further to:
   use the updated image evaluation model to evaluate another one or more candidate images relating to another image; and
   determine another identification of another feature of the other image based on the other one or more candidate images.

4. The device of claim 1, wherein the one or more processors are further to:
   determine that the embeddings error does not satisfy a threshold;
   iterate, based on determining that the embeddings error does not satisfy the threshold, image generation and image evaluation using a result of determining the image embeddings and the embeddings error to determine another image embeddings and another embeddings error; and
   wherein the one or more processors, when determining the identification of the feature of the image, are to:
      determine the identification of the feature of the image based on the other image embeddings and the other embeddings error.

5. The device of claim 1, wherein the action is associated with causing an autonomous vehicle to be controlled.

6. The device of claim 1, wherein the one or more processors, when performing the action relating to the identification of the feature, are to:
   communicate with another device to provide a command relating to altering functioning of the other device based on the identification of the feature.

7. The device of claim 1, wherein the feature of the image is at least one of:
   a biometric feature,
   an object,
   an image segment, or
   a message.

8. The device of claim 1, wherein the image evaluation model is a deep reinforcement learning model.

9. The device of claim 1, wherein the image generation model is a generative adversarial networks (GANs) model.

10. The device of claim 1, wherein the image is at least one frame of a video recording.

11. The device of claim 1, wherein the image comprises a low resolution image.

12. The device of claim 1, wherein the one or more processors, when determining, using the image evaluation model, that the one or more candidate images are processed during image generation and using the image generation model, are to:
   receive a set of historical high resolution images; and
   compare the one or more candidate images to the set of historical high resolution images.

13. A method, comprising:
obtaining, by a device, an item of media;
generating, by the device and based on the item of media and using a media generation model, a set of candidate media for object recognition;
determining, by the device and based on the set of candidate media and using a media evaluation model, that one or more candidate media, of the set of candidate media, are processed during media generation and using the media generation model to improve a quality of a feature of the item of media;
determining, by the device, media embeddings for the one or more candidate media and based on the item of media;
determining, by the device, an embeddings error for the one or more candidate media based on the media embeddings and the item of media;
determining, by the device, an identification of the feature of the item of media based on the media embeddings and the embeddings error; and
communicating, by the device, with another device to provide information identifying the feature based on determining the identification of the feature.

14. The method of claim 13, wherein the item of media is at least one of:
an image,
a video recording,
an audio recording,
a virtual reality representation, or
a data representation.

15. The method of claim 13, wherein the quality of the feature is at least one of:
a resolution,
a sharpness, or
a contrast.

16. The method of claim 13, wherein determining the identification of the feature comprises:
determining the identification of the feature using a simultaneous localization and mapping (SLAM) object detection procedure.

17. The method of claim 13, wherein determining the identification of the feature comprises:
identifying an object in the item of media.

18. The method of claim 13, further comprising:
segmenting the item of media based on the identification of the feature; and
wherein communicating with the other device to provide information identifying the feature comprises:
providing information relating to segmenting the item of media.

19. The method of claim 13, wherein obtaining the item of media comprises:
requesting a low-resolution version of the item of media, wherein the low-resolution version is associated with a reduced file-size relative to other versions of the item of media; and
wherein generating the set of candidate media comprises:
generating at least one high-resolution version of the item of media based on the low-resolution version, wherein the at least one high-resolution version is associated with a higher file-size than the low-resolution version.

20. A non-transitory computer-readable medium storing instructions, the instructions comprising:
one or more instructions that, when executed by one or more processors, cause the one or more processors to:
generate, based on an image and using an image generation model, a set of candidate images for object recognition,
wherein each candidate image, in the set of candidate images, is associated with an increased image resolution relative to the image;
determine image embeddings for the set of candidate images and based on the image;
determine that an embeddings error threshold for the image embeddings is satisfied;
determine an identification of a feature of the image based on the image embeddings and based on determining that the embeddings error threshold is satisfied; and
provide information identifying the feature of the image based on determining the identification of the feature.

21. The non-transitory computer-readable medium of claim 20, wherein the one or more instructions, when executed by the one or more processors, further cause the one or more processors to:
use a reinforcement learning based image evaluation module to evaluate the set of candidate images;
determine that a resolution criterion is satisfied based on evaluating the set of candidate images; and
wherein the one or more instructions, that cause the one or more processors to determine the image embeddings, cause the one or more processors to:
determine the image embeddings based on determining that the resolution criterion is satisfied.

22. The non-transitory computer-readable medium of claim 20, wherein the image is a video and wherein the set of candidate images is a set of frames of the video.

* * * * *